United States Patent
Buonerba et al.

(10) Patent No.: US 12,337,745 B1
(45) Date of Patent: Jun. 24, 2025

(54) APPARATUS FOR TRANSPORTING LIQUID MATERIALS

(71) Applicant: Bulk Cargo Systems, LLC, Charleston, SC (US)

(72) Inventors: David Buonerba, Charleston, SC (US); John C. Cunningham, Alden, NY (US)

(73) Assignee: Bulk Cargo Systems, LLC, Harleston, SC (US)

( * ) Notice: Subject to any disclaimer, the term of this patent is extended or adjusted under 35 U.S.C. 154(b) by 0 days.

(21) Appl. No.: 18/901,281

(22) Filed: Sep. 30, 2024

(51) Int. Cl.
*B60P 3/24* (2006.01)
*B60P 3/22* (2006.01)
*B60P 3/42* (2006.01)
*B65D 90/52* (2006.01)

(52) U.S. Cl.
CPC ............. *B60P 3/426* (2013.01); *B60P 3/2215* (2013.01); *B60P 3/226* (2013.01); *B60P 3/243* (2013.01); *B65D 90/52* (2013.01)

(58) Field of Classification Search
CPC ................................ B65D 90/52; B60P 3/426
USPC ........................................................ 220/1.6
See application file for complete search history.

(56) References Cited

U.S. PATENT DOCUMENTS

| | | | |
|---|---|---|---|
| 4,611,724 A * | 9/1986 | Watkins | B65D 90/52 220/563 |
| 4,764,408 A * | 8/1988 | Stedman | B29C 67/247 220/88.1 |
| 6,015,055 A | 1/2000 | Bonerb et al. | |
| 6,065,265 A | 5/2000 | Stenekes | |
| 6,131,756 A | 10/2000 | Bonerb et al. | |
| 6,216,900 B1 | 4/2001 | Bonerb et al. | |
| 6,299,437 B1 | 10/2001 | Bonerb et al. | |
| 8,132,686 B2 | 3/2012 | Buonerba | |
| 10,137,809 B2 | 11/2018 | Postek et al. | |
| 11,643,003 B1 * | 5/2023 | Buonerba | B65D 90/046 220/1.5 |

FOREIGN PATENT DOCUMENTS

CN 214 030 247 U 8/2021

* cited by examiner

*Primary Examiner* — Stephen J Castellano
(74) *Attorney, Agent, or Firm* — Simpson & Simpson, PLLC

(57) ABSTRACT

An apparatus for use in an elongated shipping container for selectively carrying solid freight and bulk liquid freight comprising a frame fixedly secured to the elongated shipping container, the frame comprising at least: two side members and at least one end member connected to the side members, a collapsible liquid container removably connected to the frame, the container having a liquid impermeable outer liner and a liquid impermeable inner bladder arranged within the outer liner, a fluid conduit in fluid communication with the inner bladder and removably connected to the frame, and at least one baffle operatively arranged to removably secured to the frame and on top of the collapsible liquid container.

20 Claims, 11 Drawing Sheets

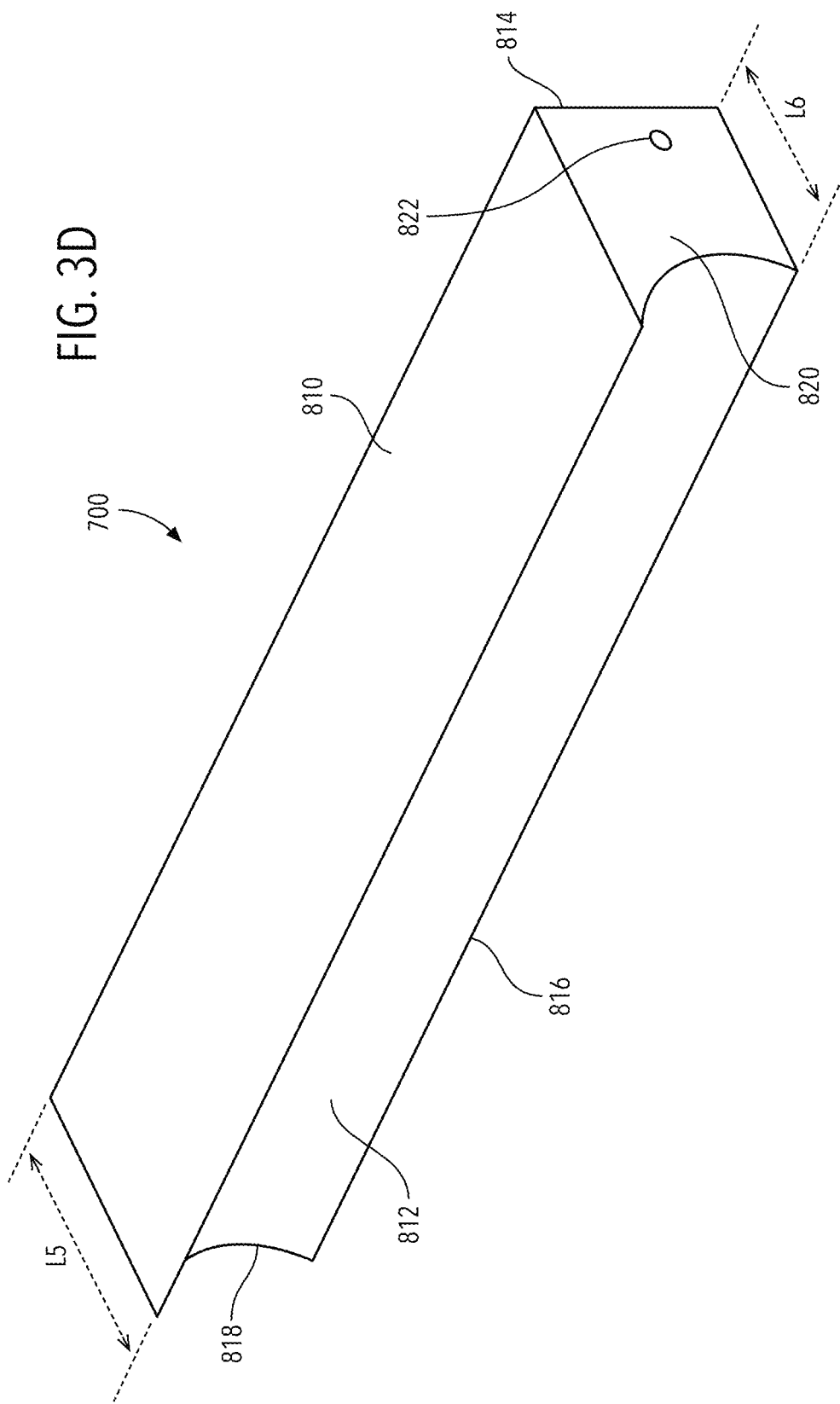

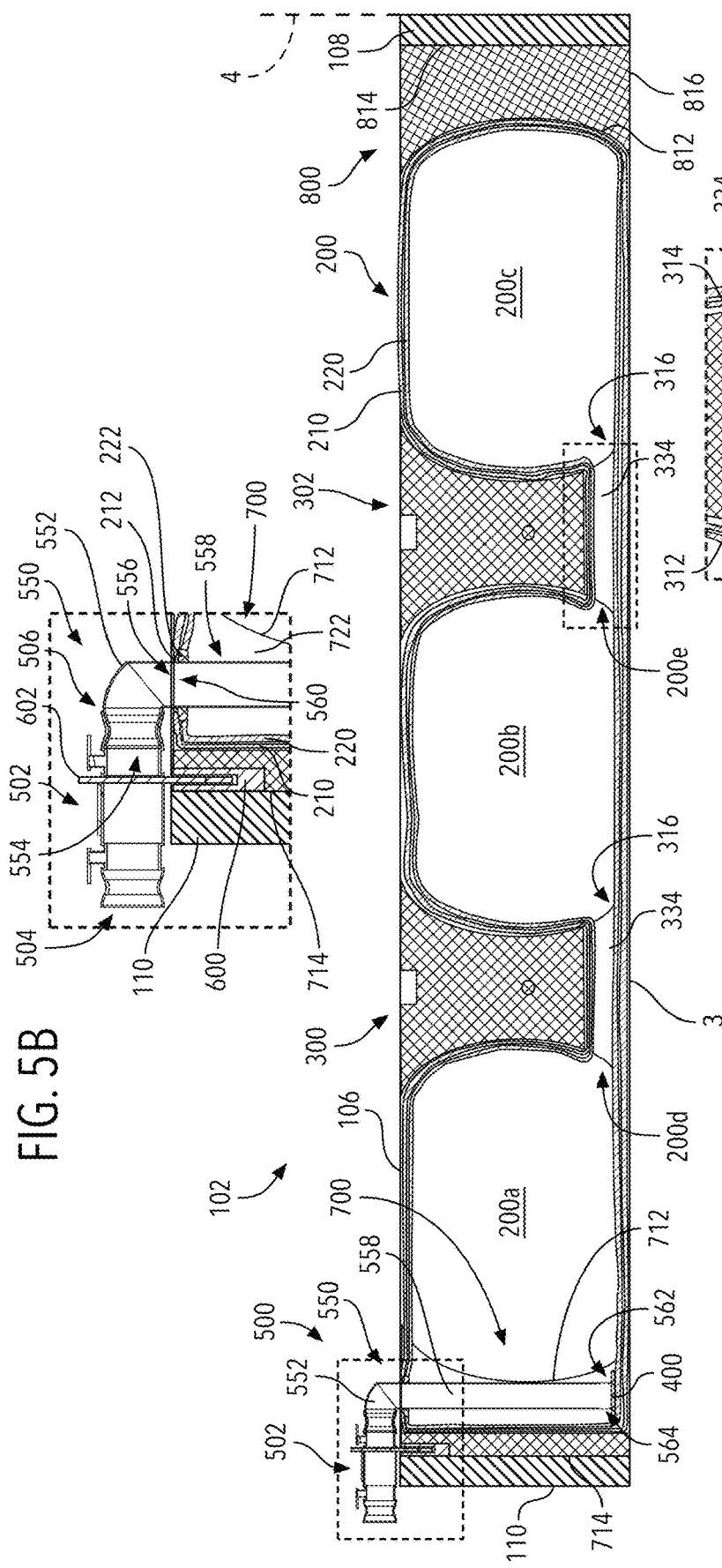
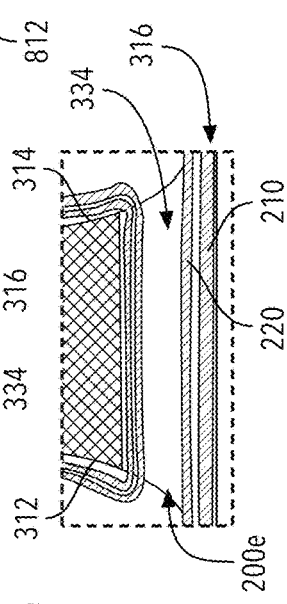

APPARATUS FOR TRANSPORTING LIQUID MATERIALS

FIELD

This disclosure relates generally to a method and apparatus for transporting liquid materials, particularly bulk liquid, by vehicle and more particularly to a method and apparatus for transporting such materials in a shipping container that can also be used for transporting conventional dry materials or other non-liquid cargo. More specifically, this disclosure relates to collapsible tanks for freight containers, or shipping containers, that allow the container arranged on a transport vehicle, such as a truck trailer, ocean borne container, railroad car or container, or the like, to be converted to selectively carry solid freight or bulk liquid freight.

BACKGROUND

Previously used containers, particularly containers that are cleaned and inspected between uses must provide access to the inside of the container to permit a person to enter the container and clean the interior thereof. Typically, such containers have used a man port on the upper surface of the container through which a person can enter to clean and inspect the container. Thus, the container must be high enough, and the man port big enough to permit entry and cleaning. Increasing the size of a container raises the center of gravity of that container and makes it less stable than desired.

In addition, the transportation of liquids in containers that are attached to a vehicle rather than rigid containers that form an integral part of the vehicle can lead to instability issues associated with sloshing of the liquid. In extreme cases, the sloshing can cause problems in controlling the vehicle. Known transport systems fail to address these problems.

A variety of collapsible tanks of different types are directed to transporting liquid cargo, e.g., the collapsible tanks disclosed in U.S. Pat. No. 6,015,055 (Bonerb et al.), U.S. Pat. No. 6,065,265 (Stenekes), U.S. Pat. No. 6,131,756 (Bonerb et al.), U.S. Pat. No. 6,216,900 (Bonerb et al.), U.S. Pat. Nos. 6,299,437 6,299,437, and 8,132,686 (Buonerba et al.), and U.S. Pat. No. 10,137,809 (Postek et al.) While the collapsible containers described in these patents have been successful to varying degrees, and have provided some advantages over liquid transfer vessels used in the past, there remains a need for containers that are especially adapted for use in transporting liquids, including but not limited to liquid food/beverage products and liquid chemicals, which containers are inexpensive, are extremely clean, eliminate the need for cleaning between loads, are lighter than previously known containers thereby permitting transport of higher payloads, are made from recyclable materials, have a low carbon footprint, have a low center of gravity, reduce or eliminate the effects of sloshing of liquids during transport, improve driver safety and can be more easily, more safely, and more quickly converted between a liquid carrier and a dry freight carrier. The present disclosure addresses improving these characteristics of containers for transporting liquids.

As described above, containers for transporting liquids, especially containers convertible between liquid transport and dry freight transport have employed a reusable (after cleaning) flexible inner liner and a flexible outer shell attached to top and bottom frame portions of a selectively deployable tank. The tanks so constructed have been configured with a man-sized opening in the top of the inner liner to permit a person to enter the tank for cleaning and have necessarily been high enough for a person to enter and clean the tank from the inside. The center of gravity of such tanks is higher than would otherwise be desirable because of the height requirements for cleaning. More specifically, local occupational safety and health regulations in some countries have required that such tanks be at least four (4) feet high to permit a person to enter the tank for cleaning and/or inspection for cleanliness.

Cleaning the known tank configurations between uses adds considerable extra expense. The cost to enter and clean a tank can be in excess of hundreds of dollars per cleaning. The cost is due in part to the need to reposition the carrier from the liquid cargo discharge location to a certified wash facility and subsequently to a dry freight loading point. In addition to the actual wash charge, the time to dry the cleaned tank, and time to seal the openings, valves, and hoses for reloading increase the cost.

During cleaning of previously used tanks, a person may be required to climb to the top of a conventional tanker, possibly twelve (12) feet or higher, to either enter the tank through the man way for inspection or to take samples of the product prior to unloading. This operation is unnecessary using embodiments of the present disclosure.

In addition to the expense, cleaning known tanks requires considerable amounts of water, often potable water, and cleaners, and produces effluents that must be disposed of in accordance with local requirements. In short, this cleaning operation further increases the cost of using known containers. As with other issues described above, embodiments of the present disclosure overcome these issues.

Known tanks weigh hundreds of pounds or more and this weight limits the amount of liquid that can be carried in trucks with a fixed maximum gross weight. In other terms, weight consumed by the tank itself decreases the amount of transportable product.

Known reusable tanks have been fabricated in various standard sizes that do not always match the amount of liquid transported in any particular load. This creates the possibility of transporting a less than full tank, which in turn, promotes liquid sloshing as the transport vehicle moves. In many cases, this reduces vehicle stability. The Postek et al. solution is an example of a tank apparatus that does not address the issues of vehicle stability if such tank apparatus was transported via a vehicle. Aspects of the present disclosure use several techniques for reducing the effects of sloshing liquid during transit.

One solution to many of the aforementioned disadvantages is disclosed at length in U.S. Pat. No. 11,643,003, issued May 9, 2023, which patent is incorporated by reference herein in its entirety. However, in a desire to solve these problems, the invention disclosed therein is rather complex, meaning, the invention discloses a movable and collapsible frame. The complexity of assembly and disassembly, for the respective transportation of wet and dry goods, makes operation difficult—especially for a single operator. Further, the liner disclosed therein is only water-tight on the inner layer thereof, and not the outer layer, potentially leading to leakage or spillage issues during transit.

As can be derived from the variety of devices and methods directed at transporting liquid cargo, many means have been contemplated to accomplish the desired end, i.e., safe, sanitary, and cost-effective shipments. Heretofore, tradeoffs between safety, convenience and cost were required.

Thus, there still exist a need for device and/or apparatus that utilizes fewer overall components-thereby decreasing overall weight, provides a more reliable leak-proof or spill-proof liquid storage, can be easily assembled/disassembled by a single operator, includes a more secure valve mechanism for filling/emptying the liquid storage therein, and a simpler solution to reducing liquid slosh during transportation in a removable manner.

Moreover, there still is a need for a device and/or apparatus that further increases the safety of transporting liquid cargo, which device and/or apparatus lowers a center of the liquid container by utilizing substantially more width of the freight container such as a truck trailer, ocean borne container, railroad car or container, or the like, thereby increasing the stability of the vehicle transporting the freight container.

SUMMARY

According to aspects illustrated herein, there is provided an apparatus for use in an elongated shipping container, e.g., a shipping container on a trailer, for selectively carrying solid freight and bulk liquid freight comprising a frame fixedly secured to and within the shipping container, the frame comprising at least: two side members and at least one end member connected to the side members, a collapsible liquid container removably connected to the frame, the container having a liquid impermeable outer liner and a liquid impermeable inner bladder arranged within the outer liner, a fluid conduit in fluid communication with the inner bladder and removably connected to the frame, and at least one baffle operatively arranged to be removably secured at least partially within the frame and on top of the collapsible liquid container.

In some embodiments, the aforementioned apparatus may further comprise a second baffle (i.e., a first and second baffle) operatively arranged to removably secure to the frame and on top of the collapsible liquid container, whereas the at least one baffle (i.e. the first baffle) and the second baffle are spaced apart. Alternatively, the aforementioned apparatus may further comprise a third and fourth baffle, where each of the first, second, third, and fourth baffle may have at least one concave face thereon.

In one aspect, the present invention may comprise an apparatus for use in a shipping container for selectively carrying solid freight and bulk liquid freight, the apparatus including a first side frame extending longitudinally with respect to the shipping container and fixedly secured thereto, a second side frame extending longitudinally with respect to the shipping and fixedly secured thereto, a front frame positioned between the first and second side frames, a collapsible liquid container operatively arranged substantially between the first and second side frames, the liquid container further comprising: a liquid impermeable outer liner; a liquid impermeable inner bladder arranged within the outer liner; and, a fluid conduit in fluid communication with the inner bladder, a rear fame removably affixed to the first and second side frames opposite the front frame, and at least one baffle operatively arranged to be positioned between the first and second side frames and on top of the collapsible liquid container, wherein the collapsible liquid container is adapted to be removably pinned at least partially within the frame via the at least one baffle.

In some configurations, the aforementioned apparatus further comprises a first baffle operatively arranged to be positioned between the first and second side frames and on top of the collapsible liquid container, and a second baffle operatively arranged to be positioned between the first and second side frames and on top of the collapsible liquid container and spaced apart from the first baffle.

In one possible embodiment, each of the aforementioned first and second baffles comprise: a top face and a bottom face bounded by a pair of side faces; a pair of concave faces disposed between the top and bottom faces; and, a channel arranged within the pair of concave faces and the bottom face.

In some embodiments, each of the first and second baffles may also comprise a channel disposed within said top and said pair of side faces, the channel operatively arranged to accept a support member therein.

In a further possible configuration, the aforementioned apparatus further comprises a front end baffle arranged at least partially within the side frames and proximate the front frame, the front end baffle having: a top face and bottom face bounded by a pair of side faces; a concave face disposed between the top and bottom faces and facing the rear frame; and, a rear face disposed between the top and bottom faces and facing the front frame.

In another configuration, the aforementioned apparatus further comprises a rear end baffle arranged at least partially within the side frames and proximate the rear frame, the rear end baffle having: a top face and bottom face bounded by a pair of side faces; a concave face disposed between the top and bottom faces and facing the rear frame; a rear face disposed between the top and bottom faces and facing the rear frame; and, a conduit channel disposed within the top, bottom, and concave face, wherein the conduit channel is adapted to accept at least a portion of the fluid conduit at least partially therein.

In some embodiments, the aforementioned apparatus may further comprise at least one retaining cover adapted to at least partially cover a space disposed between the side frames, the at one retaining cover retractably secured to a top surface one of the side frames and removably secured to a top surface of the opposite side frame, the at least one retaining cover further adapted to pin the at least one baffle down and onto the liquid container.

In some embodiments, the aforementioned fluid conduit further comprises a longitudinal tube portion having a first end and a second end, the first end arranged within the inner bladder and the second end extending through the inner bladder and affixed thereto, and a connection elbow extending from the first end.

In other configurations, the aforementioned fluid conduit further comprises a valve affixed to the front frame and arranged to removably secure to the connection elbow.

In some embodiments, the aforementioned apparatus further comprises a sliding plate connected to the rear frame and adapted to move vertically, the valve affixed to the sliding plate.

In other configurations, the at least one baffle is configured to absorb energy from liquid disposed in the collapsible liquid container In further embodiments, the baffles are comprised of one or more of an open cell foam or a closed cell foam.

In further possible configurations, the rear end baffle is comprised of one or more of an open cell foam or a closed cell foam.

In even further possible configurations, the front end baffle is comprised of one or more of an open cell foam or a closed cell foam.

In still further possible configurations, the aforementioned apparatus may further comprise a retraction line removably secured to the liquid impermeable outer liner, the retraction line adapted to be secured to an inner surface of a wall of the shipping container, thereby allowing the liquid impermeable outer liner to be pulled along the retraction line in a direction towards the front frame when the liquid impermeable inner bladder is empty.

Generally, the first, second, third, and fourth baffles (300, 302, 700, 800) of the aforementioned apparatus (100) are generally configured to absorb energy from liquid disposed in the collapsible liquid container (200), thereby dampening a liquid sloshing effect from the liquid disposed in the collapsible liquid container (200) produced when the shipping container (2) is in motion. Further, the first, second, third, and fourth baffles (300, 302, 700, 800) of the aforementioned apparatus (100) each include at least one concave face, which concave faces are designed to redirect liquid or fluid within the liquid container in one or more of a direction away from the concave face or downwardly.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which:

FIGS. 3B through 3D are a perspective views of end baffles of the invention shown in FIG. 1;

FIG. 5A is a cross-sectional view of the frame and fluid container taken generally along line 5-5 in FIG. 1;

FIG. 5B is an enlarged portion taken from FIG. 5A generally illustrating a fluid conduit;

FIG. 5C is an enlarged portion taken from FIG. 5A generally illustrating one of the middle baffles and its respective passageway; and, FIGS. 6A and 6B are cross-sectional views from FIG. 5A generally showing fluid movement within the fluid container.

DETAILED DESCRIPTION

Figure 1:
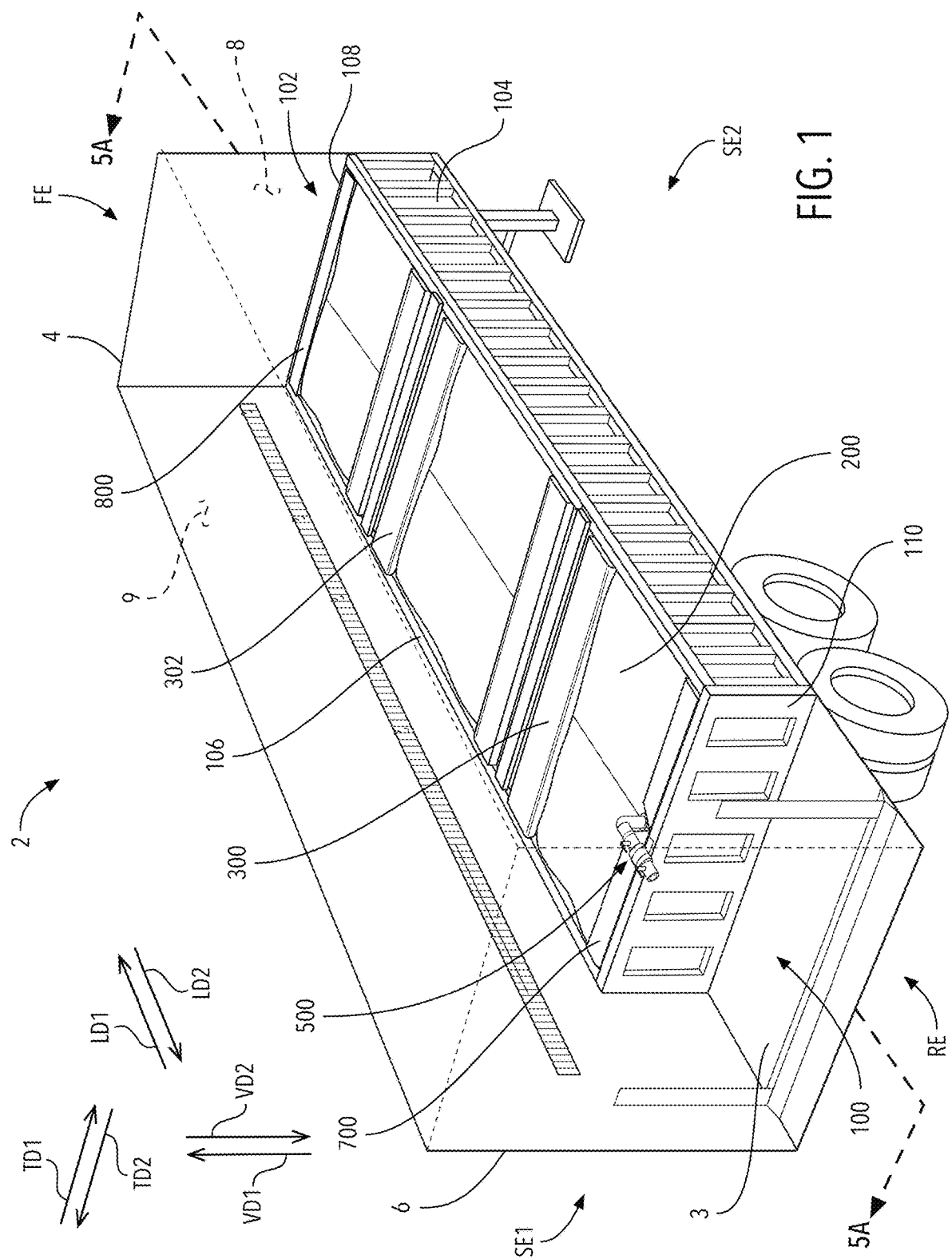
FIG. 1 is a perspective view of a shipping container, partly in phantom, showing a frame having a fluid container therein in accordance with one aspect of this disclosure configured for transporting liquid cargo.

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, pneumatics, and/or springs.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

It should be understood that use of "or" in the present application is with respect to a "non-exclusive" arrangement, unless stated otherwise. For example, when saying that "item x is A or B," it is understood that this can mean one of the following: (1) item x is only one or the other of A and B; (2) item x is both A and B. Alternately stated, the word "or" is not used to define an "exclusive or" arrangement. For example, an "exclusive or" arrangement for the statement "item x is A or B" would require that x can be only one of A and B. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Moreover, as used herein, the phrases "comprises at least one of" and "comprising at least one of" in combination with a system or element is intended to mean that the system or element includes one or more of the elements listed after the phrase. For example, a device comprising at least one of: a first element; a second element; and, a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element. A similar interpretation is intended when the phrase "used in at least one of:" is used herein. Furthermore, as used herein, "and/or" is intended to mean a grammatical conjunction used to indicate that one or more of the elements or conditions recited may be included or occur. For example, a device comprising a first element, a second element and/or a third element, is intended to be construed as any one of the following structural arrangements: a device comprising a first element; a device comprising a second element; a device comprising a third element; a device comprising a first element and a second element; a device comprising a first element and a third element; a device comprising a first element, a second element and a third element; or, a device comprising a second element and a third element.

Broadly, embodiments of the present disclosure comprise a substantially fixed frame having a collapsible liquid container comprising an outer liner and an inner bladder, the inner bladder arranged to receive a fluid therein, where both the outer liner and inner bladder are liquid impermeable, at least one baffle, and a fluid conduit in fluid communication with the inner bladder. It should be appreciated that the present disclosure may include additional elements, e.g., a pair of baffles, a securement mechanism for the at least one bladder, at least one removable end frame, fluid conduit having a valve and a inlet/outlet tube in communication with the inner blade where the valve is arranged to removably secure to the inlet/outlet tube, and means to removably secure the collapsible liquid container to the frame.

Figure 2A:
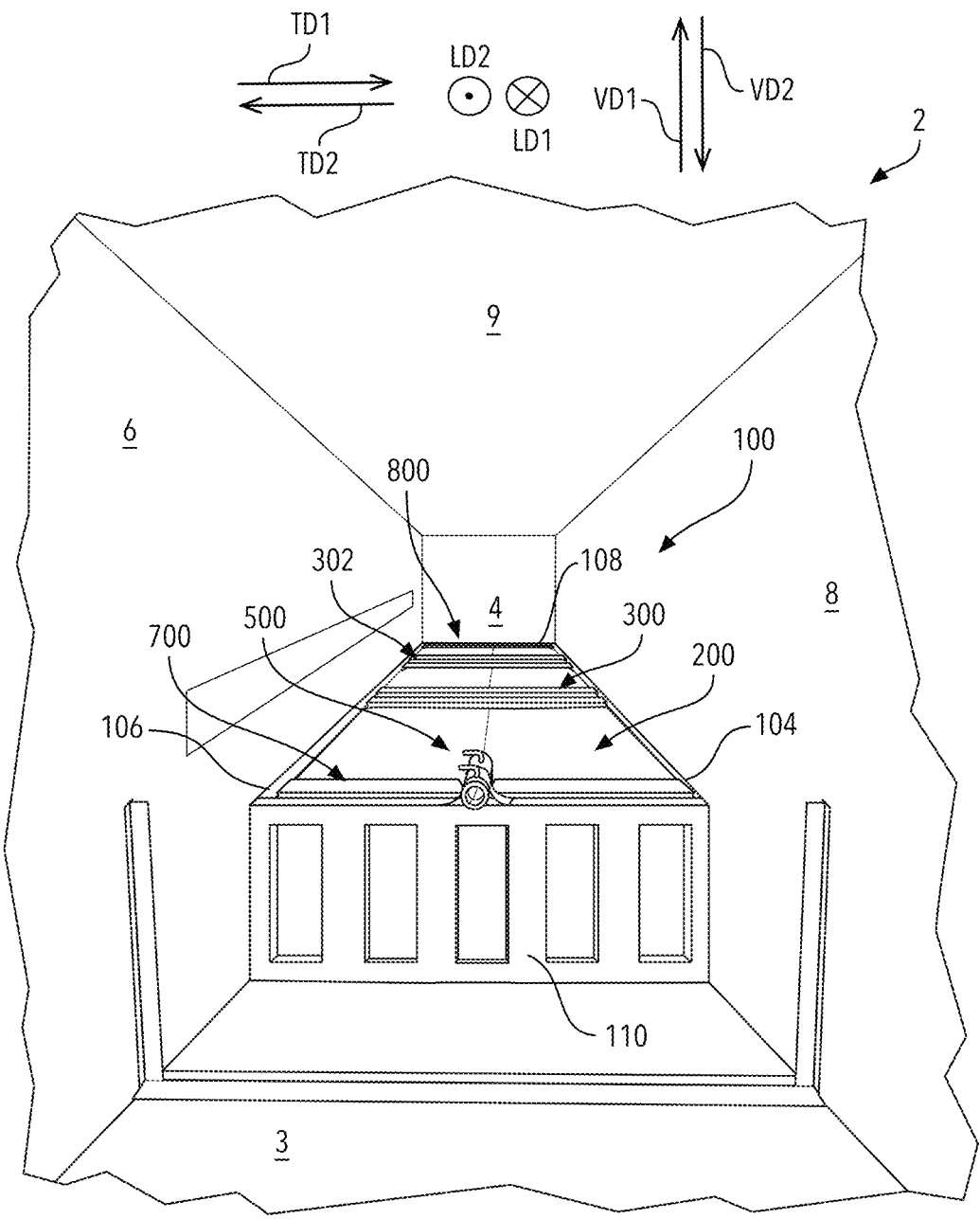
FIG. 2A is a rear view of the invention shown in FIG. 1.
Figure 2B:
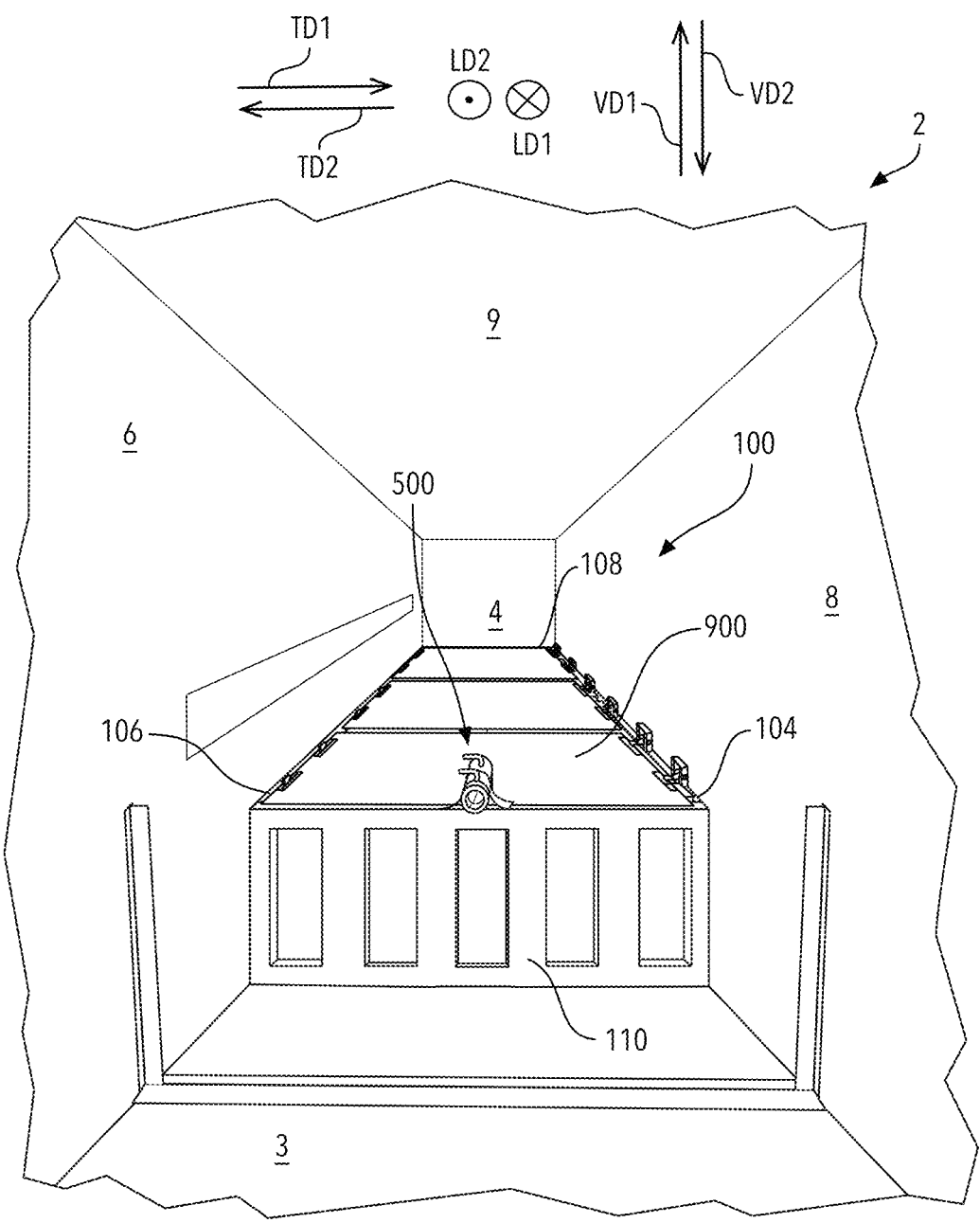
FIG. 2B is a rear view of the invention shown in FIG. 2A with retaining covers removably attached to the frame.

Adverting now to the figures, an exemplary embodiment of a present apparatus for transporting liquid is illustrated in FIGS. 1 through 2B, specifically FIG. 1 generally shows a perspective view of the apparatus arranged within an embodiment of a shipping container, particularly a shipping container arranged to be transported by a tractor trailer. FIGS. 2A and 2B generally show a rear view of the same, where FIG. 2B illustrates retaining covers arranged on a frame of the apparatus.

Liquid transporting tank apparatus 100 (hereinafter "apparatus"), in accordance with an aspect of the present disclosure, is illustrated as it could be installed in shipping container 2 of a tractor-trailer truck (not shown). "Shipping container" is intended to mean a "freight container," "cargo container," "intermodal container," "iso container," "sea container" or "ocean container," "sea can" or "c-can," "container van" or "dry van," "insulated container," "double door container," "swap body container," and the like, and such terms are intended to be interchangeable. Collapsible liquid container 200 (hereinafter "container") is removably contained within frame 102, whereas frame 102 comprises a plurality of interconnected frame-members disposed within the shipping container, preferably spanning at least a substantial portion between front wall 4 and rear wall 3 and also spanning between sidewalls 6 and 8. In some embodiments, container 200 is contained within first and second sidewalls 104 and 106, respectively, and front and rear end walls 108 and 110, respectively, that together form a generally rectangular enclosure, i.e., frame 102. Preferably, sidewalls 104 and 106 are fixedly attached to the shipping container body, i.e., at least one of sidewalls 6 and 8 and floor 3, thereby affording a maximum distance therebetween in transverse directions TD1 and TD2, i.e., a distance between sidewalls 6 and 8. It could be said that frame 102 may be comprised of sidewalls 104 and 106, end walls 108 and 110, and floor 3, such that frame 102 is generally a rectangular enclosure having a bottom or a floor. It should be appreciated that frame 102 could separately include a floor member being connected to one or more of sidewalls 104 and 106 and end walls 108 and 110. Preferably, at least sidewalls 104 and 106 are fixedly secured to the shipping container body, e.g., one or more of wall 6, wall 8, or floor 3.

In other possible configurations, front end wall 108 may be formed from front wall 4 of shipping container 2 or a separate front wall panel or member may be used. When front end wall 108 is formed by front wall 4 of shipping container 2, side walls 104 and 106 should be positioned that the front ends of side walls 104 and 106 (i.e., the ends proximate front end FE) are close to or in contact with front wall 4 of shipping container 2. As shown in FIG. 1 and in a preferred configuration, the rear ends of side walls 104 and 106 (i.e., the ends proximate rear end RE) do not extend to the terminating end of the shipping container body proximate rear end RE, thus, providing an area on floor 3 where a user may stand within the shipping container body and access apparatus 100. In some configurations, rear end wall 110 may be removable or may be comprised of a gate-like configuration such that the aforementioned space proximate rear end RE is needed for opening and closing thereof (similar to the configurations described in U.S. Pat. No. 11,643,003).

In a preferred aspect, container 200 includes fluid conduit 500 in fluid communication therewith. Fluid conduit 500 is attached to container 200 and rear wall 110, preferably on a top surface or end thereof, such that fluid conduit 500 is raised above floor 3 of the shipping container body. Fluid conduit 500 is arranged for filling and emptying of container 200 and is detailed further, infra.

In some embodiments, container 200 is divided into two or more sections, e.g., three sections, by baffles 300 and 302 that are positioned transversely in container 200, as shown in FIG. 1. Baffles 300 and 302 extend substantially from the top of frame 102, i.e., first and second sidewalls 104 and 106, respectively, and front and rear end walls 108 and 110, respectively, downwardly towards base or floor 3 of shipping container 2. Baffles 300 and 302 may extend beyond respective top surfaces of sidewalls 104 and 106, i.e., a greater distance in vertical direction VD1. In a preferred embodiment, container 200 further includes end baffles, rear end baffle 700 and front end baffle 800, where front end baffle 800 is arranged between sidewalls 104 and 106 and proximate front end wall 108, and where rear end baffle 700 is arranged between sidewalls 104 and 106 and proximate rear end wall 110. Thus, one section of container 200 is formed between rear end baffle 700 and baffle 300, a second section of container 200 is formed between baffles 300 and 302, and a third section of container 200 is formed between baffle 302 and front end baffle 800. Baffles 300, 302, 700, and 800 are discussed further, infra.

In reference to FIG. 2B, the aforementioned baffles (e.g., baffles 300, 302, 700, and 800 in FIGS. 1 and 2A) are arranged to be placed between sidewalls 104 and 106 such that the baffles rest on the top of container 200. When container 200 is filled within a liquid, the liquid therein would displace the baffles. To avoid this, a plurality of retainer covers, or retaining covers 900, are removably connected to sidewalls 104 and 106 and over the baffles, thereby maintaining the baffles in a position on top of filled container 200. Retaining covers 900 are described further infra.

Figure 2C:
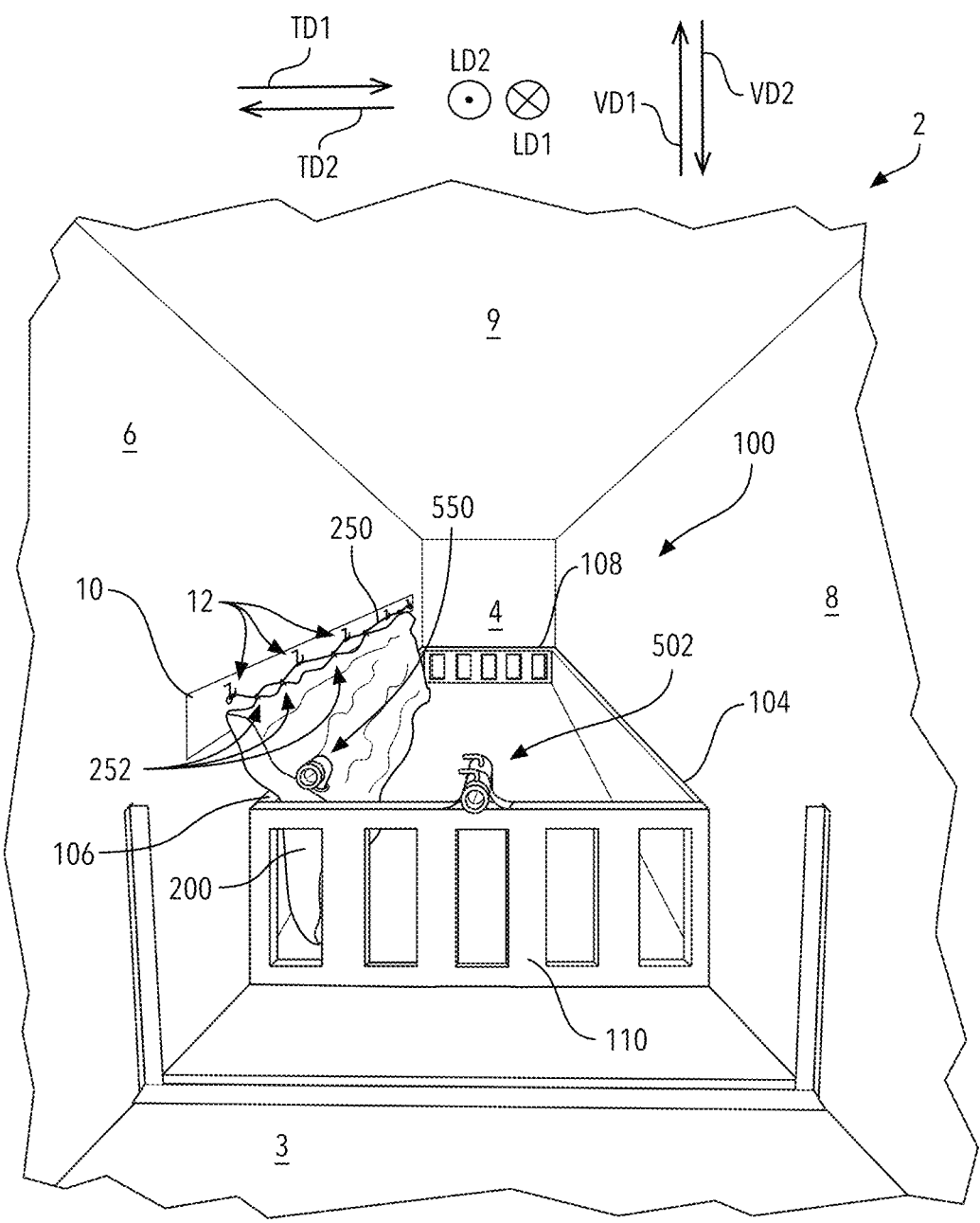
FIG. 2C is a rear view of the invention shown in FIG. 2A with the baffles removed and an empty fluid container removably connected to a retraction line attached to a wall of the shipping container.

FIG. 2C shows a rear view of apparatus 100 arranged within shipping container 2. The baffles, shown generally in FIGS. 1 and 2A, are removed from apparatus 100 and container 200 is show substantially empty. Shipping container 2 may include at least one of rail 10, mounted one either of side walls 6 or 8, or a pair of rails mounted on each of sides walls 6 or 8. It should be appreciated that rail 10 is generally known within the art of shipping containers or trailers, as the rail provides a plurality of mounting locations that can accept hooks, dividers, spacers, shelves (across a pair of rails on opposite side walls), and the like. As shown in FIG. 2C, hooks 12 are removably mounted on rail 10 on sidewall 6. The empty liquid container, container 200, is removably attached to retraction line 250, where line 250 is removably attached to hooks 12, e.g., resting on each of hooks 12 and having its respective terminating ends secured to one or more of a pair of end hooks of hooks 12 or rail 10. Retraction line 250 may comprise a steel rope, a wire rope, etc., such that clips 252 may be removable secured, in a translatable manner, to retraction line 250. Clips 252 may take a plurality of forms, such as but not limited to carabiner clips, locking connector loops, cable seals, etc. Clips 252 are preferably removably attached to an edge of container 200, where a plurality of one or more of grommets or apertures may be arranged proximate an edge of container 200. This configuration allows empty container 200 to be removably secured to retraction line 250 such that empty container 200 may be translated along retraction line 250 in a direction towards front wall 4 of shipping container 2, thus creating space within shipping container 2 and allowing a single operator to "collapse" or "condense" empty container 200. Inversely, empty container 200 may be "expanded" or "elongated" in direction from front end wall 4 to rear end wall 110 of apparatus 100, where inlet/outlet tube 550 of empty container 200 can be connected to valve 502, forming fluid conduit 500, in preparation for filling.

Figure 3A:
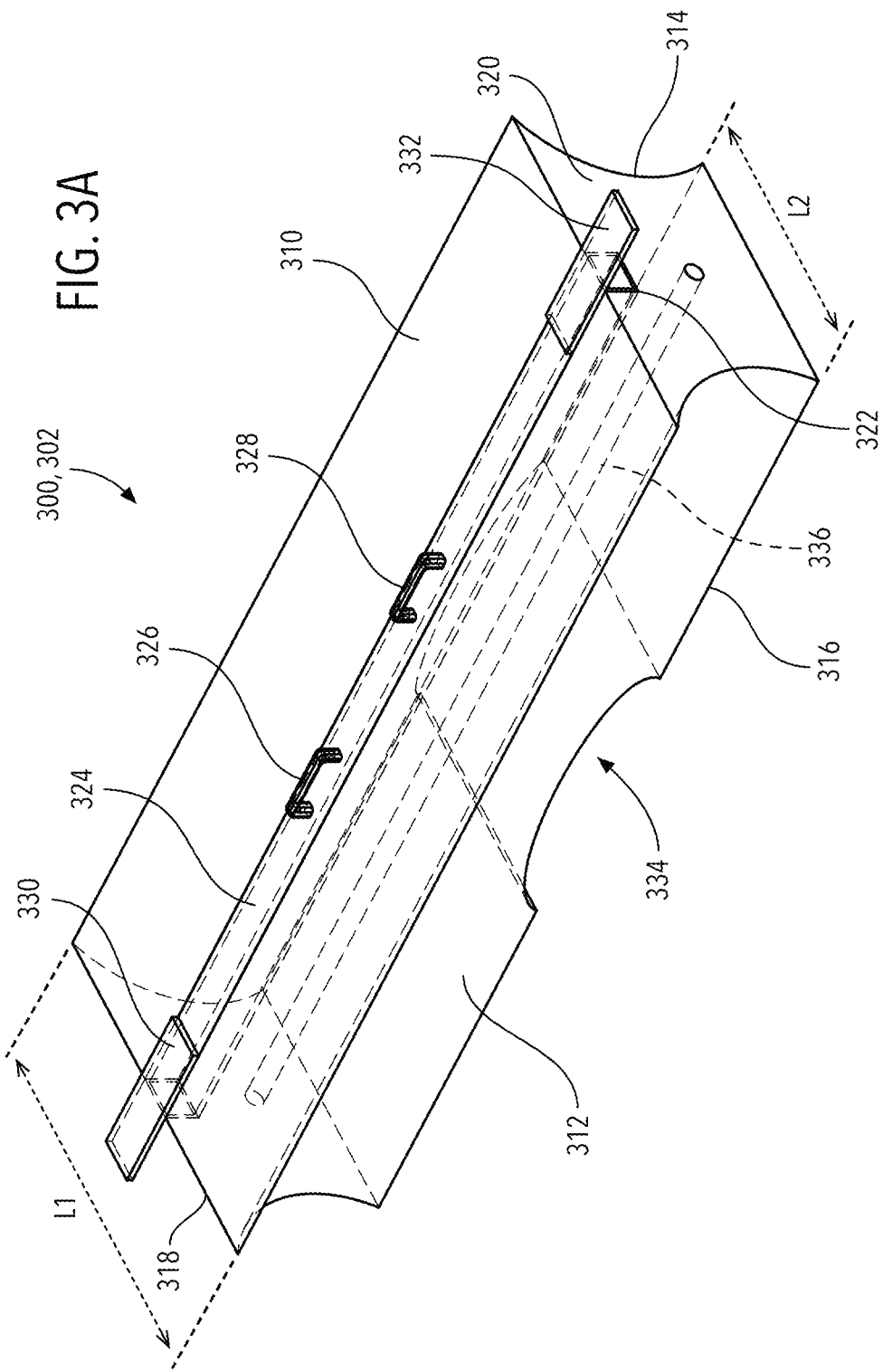
FIG. 3A is a skeleton perspective view of a baffle of the invention shown in FIG. 1.
Figure 3C:
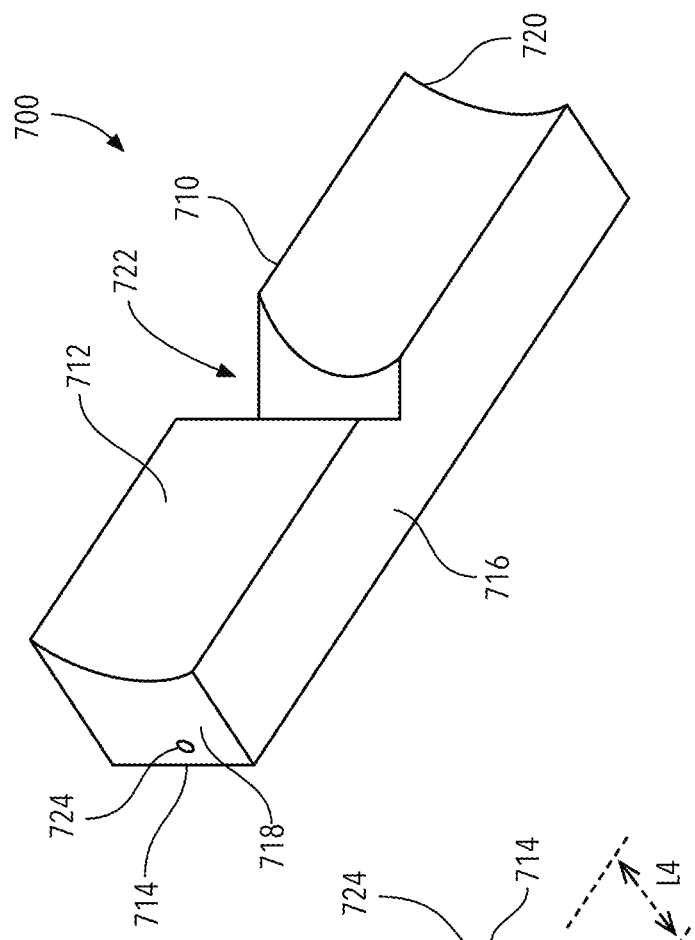
Figure 3B:
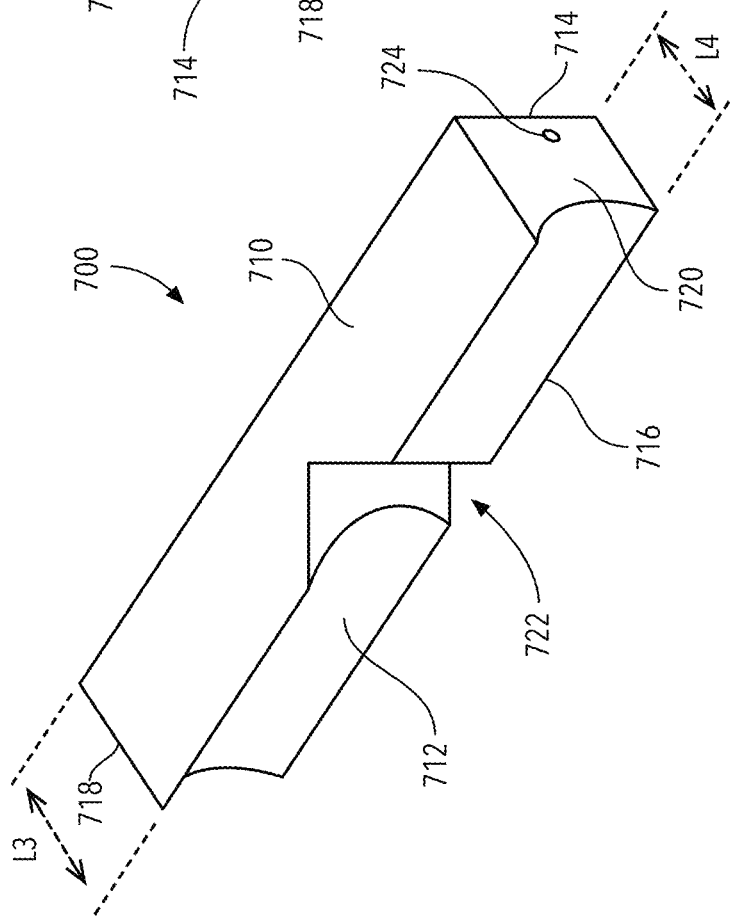

In reference to FIGS. 3A through 3C, the present invention (e.g., apparatus 100 shown in FIG. 1) is intended to utilize one or more of baffles 300, 302, 700, or 800. Preferably, in a non-limiting fashion, the apparatus utilizes each of baffles 300, 302, 700, and 800, as shown in FIGS. 1 and 2A.

Baffles 300 and 302, i.e., the middle baffles, are illustrated in FIG. 3A and are substantially identical. The middle baffles may comprise top face 310, bottom face 316, first concave face 312, second concave face 314, first side face 318, and second side face 320. Top face 310 has length L1 and bottom face 316 has length L2, where L1 is greater than L2. This arrangement makes the portion of concave faces 312 and 314 extending downwardly from top face 310 overhang or extend past the portion of concave face 312 and 314 extending upwardly from bottom face 316. Concave faces 312 and 314 are curvilinear, thereby forming a redirect for liquid movement in a direction away from the respective concave faces. Channel 322 is disposed within top face 310 and is arranged to house support beam 324 therein. Preferably, support beam 324 is fixedly secured within channel 322 and support beam 324 is preferably hollow having a polygonal cross-section to withstand compressive forces applied from the direction of one or more of side faces 318 and 320. Support beam 324 may include handles 326 and 328 attached thereto and extending therefrom. In a preferable embodiment, support beam 324 may also include extensions 330 and 332 fixedly secured on a top surface thereof and extending past the respective terminal ends of support beam 324. Extensions 330 and 332 may resemble rigid plates and are designed to rest on the top of each side wall of the frame (See FIG. 1, side walls 104 and 106 of frame 102), such that support beam 324 is positioned between the side walls of the frame, thereby preventing the side walls from collapsing in a direction towards each other. The middle baffles may also include passageway 334, e.g., an arcuate cutout disposed within bottom face 316, concave face 312 and concave face 314. In some embodiments, the middle baffles may also include a secondary support member embedded therein, e.g., internal support member 336, which may be comprised of a solid and/or hollow rod, or could be substantially similar to support beam 324.

FIGS. 3B and 3C illustrate perspective views of rear end baffle 700. As shown in FIG. 1, rear end baffle 700 is arranged to be removably placed proximate rear end 110 of frame 102. Rear end baffle 700 generally comprises top face 710, bottom face 716, concave face 712, and planar face 714 (or back face). Top face 710 has length L3 and bottom face 716 has length L4, where L3 is greater than L4. This arrangement makes the portion of concave face 712 extending downwardly from top face 710 overhang or extend past the portion of concave face 712 extending upwardly from bottom face 716. Concave face 712 is curvilinear, thereby forming a redirect for liquid movement in a direction away from the respective concave face. Rear end baffle 700 may also include cutout 722 disposed within one or more of concave face 712, top face 710, and bottom face 716 and is adapted to allow a portion of the fluid conduit of the present invention to rest at least partially therein, described further infra. Additionally, rear end baffle 700 may also include a support member embedded therein, e.g., internal support member 724, which may be comprised of a solid and/or hollow rod, or could be substantially similar to support beam 324, shown in FIG. 3A.

FIG. 3D illustrates a perspective of front end baffle 800. As shown in FIG. 1, front end baffle 800 is arranged to be removably placed proximate front end 108 of frame 102.

Front end baffle 800 generally comprises top face 810, bottom face 816, concave face 812, and planar face 814 (or back face). Top face 810 has length L5 and bottom face 816 has length L6, where L5 is greater than L6. This arrangement makes the portion of concave face 812 extending downwardly from top face 810 overhang or extend past the portion of concave face 812 extending upwardly from bottom face 816. Concave face 812 is curvilinear, thereby forming a redirect for liquid movement in a direction away from the respective concave face. Additionally, front end baffle 800 may also include a support member embedded therein, e.g., internal support member 822, which may be comprised of a solid and/or hollow rod, or could be substantially similar to support beam 324, shown in FIG. 3A.

In reference to FIG. 3A through 3D, it should be appreciated that any material known, or hereinafter developed may be used to construct the baffles (e.g., baffles 300, 302, 700, and 800) of apparatus 100 so long as the baffles have energy-absorbing characteristics, i.e., when liquid within container 200 applies force onto one or more of the surfaces of the baffles, particularly the concave faces, the baffles may absorb those forces, or dampen those forces, and also redirect those forces away from the respective concave face. In a preferred configuration, the baffles may be comprised of a high-density foam material, open or closed cell, or any other suitable material capable of absorbing the energy of shifting liquid within the tank and may be formed in various thicknesses. Each of baffles 300, 302, 700, and 800 may be monolithic, or can be comprised of multiple sections formed together.

Figure 4:
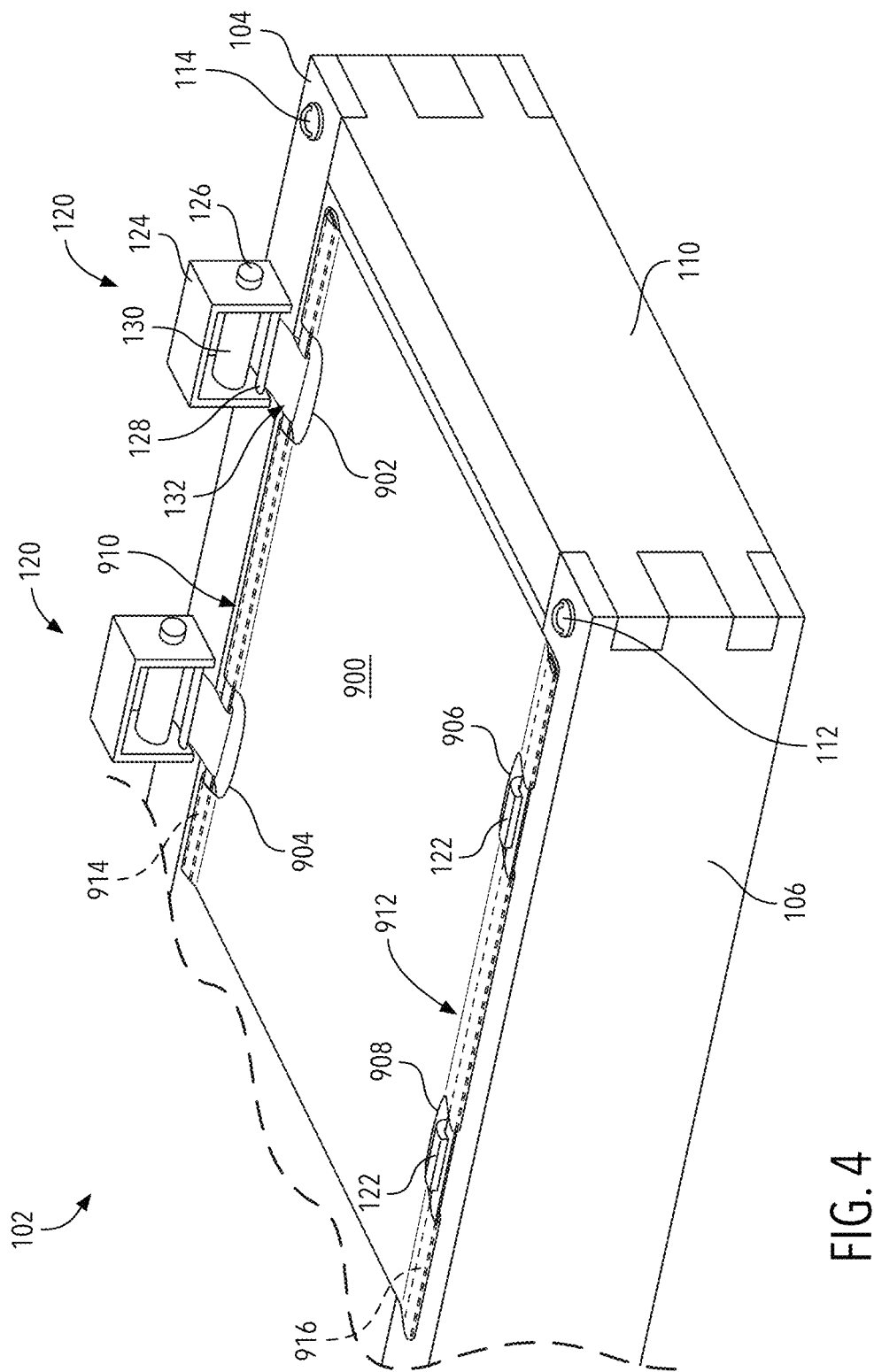
FIG. 4 is a partial perspective view of the invention in FIG. 2B, specifically showing the retaining cover and its respective attachment mechanisms.

FIG. 4 is a partial perspective view of frame 102 of the apparatus, specifically showing retaining cover 900 and its respective attachment mechanisms. FIG. 4 also illustrates pins 112 and 114 which allow rear end wall 110 to be removed from side walls 104 and 106.

As previously discussed supra and in view of FIG. 2B, retaining cover 900 is the primary element which retains all of the baffles within frame 102. Each of retaining cover 900 requires a pair of adjustable connectors 120 and a pair of hooks 122, e.g., a ratio of 1:2:2, respectively. Although the representative configuration in FIG. 4 illustrates the aforementioned ratio, one having skill in the art will appreciate that the quantity of covers, adjustable connectors, and hooks, is variable and foreseeably can be modified to reduce/increase components as necessary. Retaining cover 900 includes slots 902, 904, 906, and 908, where slots 902 and 904 allow support member 914, contained within sleeve 910, to be visible and accessible. Sleeve 910 may be formed by "rolling" a longitudinal end of retaining cover back onto itself and affixing that end to form sleeve 910. In a preferred configuration, sleeve 910 is closed at its terminating ends, thereby maintaining support member 914 therein. Support member 914 may comprise a rigid rod, beam, etc. Similarly, slots 906 and 908 allow support member 916, contained within sleeve 912, to be visible and accessible. Sleeve 912 may be formed by "rolling" a longitudinal end of retaining cover back onto itself and affixing that end to form sleeve 912. In a preferred configuration, sleeve 912 is closed at its terminating ends, thereby maintaining support member 916 therein. Support member 916 may comprise a rigid rod, beam, etc.

In a preferred embodiment, adjustable connector 120 may comprise housing 124, which substantially is U-shaped and includes spool 126 rotatably secured therethrough. Spool 126 is configured to house tether 130, allowing an excess of tether 130 to be stored within housing via rolling onto spool 126. Tether 130 is attached to spool 126 at one end (not visible) and includes loop 132 at its opposite end. Preferably, the end of tether 130 that has loop 132 is fed underneath rod 128 which assists in preventing upward movement of attached retaining cover 900. Adjustable connectors 120 are disposed on a top of surface of one of side walls 104 or 106. Preferably, loop 132 is permanently wrapped around an exposed portion of support member 914, e.g., the portions of support member 914 within one or more of slots 902 or 904, however, alternative attachment methods, such as removable options, are contemplated within the scope of the appending claims.

Hooks 122 are disposed on a top surface of one of side walls 104 or 106, preferably opposite adjustable connector 120. Hooks 122 are arranged to engage an exposed portion of support member 916, e.g., the portions of support member 916 within one or more of slots 906 and 908. Once hooks 122 are engaged with support member 916, the spools of adjustable connectors 120 may all be tightened, thereby pulling retaining cover 900 taught between hooks 122 and adjustable connectors 120. As such, adjustable connectors 120, specifically, spool 126, may include a rachet mechanism which prevents slack of tether 130 from being released until the rachet mechanism is disengaged. In alternative embodiments, spools of adjacent adjustable connectors may be connected, such that both spools may be wound/unwound at the same time.

Preferably, retaining cover 900 is a Kevlar® fabric, or an equivalent having substantially comparable strength, sheer-resistant, and tear-resistant, characteristics. Since retaining cover 900 is configured to maintain the baffles in a position over a filled fluid tank within the frame, the hooks, the tethers, the adjustable connectors with their respective components, are all heavy-duty and preferably metal.

In reference to FIGS. 2C and 4, hooks 12 of rail 10 (when placed on side wall 8) could be used to removably store retaining cover 900, such that hooks 12 could engage support member 916, raising retaining cover 900 and keep it out of frame 102 for when frame 102 is used for dry goods (e.g., when the liquid container is empty and removed therefrom).

The following description should be taken in view of FIGS. 1 through 4 and in view of FIGS. 5A through 5C. FIG. 5A shows a cross-sectional view of apparatus 100 taken generally along line 5A-5A in FIG. 1, and FIGS. 5B and 5C generally illustrate enlarged portions taken from FIG. 5A. As shown in FIG. 5A, fluid container 200 is generally depicted as being filled with a fluid, e.g., bulk liquid and/or fluid cargo, positioned within frame 102, and pinned within frame 102 by baffles 300 and 302—along with a plurality of retaining members (See FIG. 4), holding baffles 300, 302, 700, and 800 within frame 102, which retaining members are removed for clarity of illustration. Baffles 300, 302, 700, and 800 substantially form sections within fluid container 200. Baffles 700 and 300 form section 200a, baffles 300 and 302 form section 200b, and baffles 302 and 800 form section 800. Passageway 334 of each of baffles 300 and 302 creates passages 200d and 200e, where passage 200d fluidly connects sections 200a and 200b and passage 200e fluidly connects sections 200b and 200c. As generally illustrated in FIGS. 5A and 5C, bottom face 316 of both baffles 300 and 302 is placed on top of fluid container 200, specifically outer line 210, in other words, baffles 300 and 302 preferably do not rest on floor 3 of shipping container 2 (See FIG. 1), whereas baffles 700 and 800 preferably rest on floor 3.

In a preferred embodiment, fluid container 200 is comprised of a liquid impermeable outer liner, e.g., outer liner 210 and a liquid impermeable inner bladder, e.g., inner bladder 220, arranged within outer liner 210. As such, outer liner 210 may include a scalable opening disposed along its length, allowing liner blader 220 to be placed therein. This opening may include a waterproof zipper apparatus allowing the opening of outer line 210 to be closed while maintaining a liquid impermeable configuration. As shown in FIG. 5B, outer liner 210 includes seal 212 which is arranged to scalable wrap around a portion of fluid conduit specifically, inlet/outlet tube 550, in a water-tight manner. Similarly, inner bladder 220 includes seal 222 which is arranged to scalable wrap around a portion of fluid conduit 500, specifically, inlet/outlet tube 550, in a water-tight manner. Seal 222 could be fixedly secured to an outer surface of inlet/outlet tube 550 via known methods such as ultrasonic welding or alternative contemplated within the art, so long as the water-tight configuration is maintained. Alternatively, seal 222 could be affixed to a flange circumscribing a portion of inlet/outlet tube 550.

In a preferred arrangement, inner bladder 220 is a liquid-impermeable material.

Inner bladder 220 may be comprised of a single-ply or two-ply thermoplastic, such as a food-grade polyethylene, or other similar thermoplastics which can form a liquid-impermeable and collapsible/deformable liquid container, which may be comprised of varying thicknesses such that liquid-impermeable characteristics are maintained. In a preferred arrangement, outer liner 210 is a liquid-impermeable material, outer liner 210 may be comprised of a thermoplastic, single-ply or two-ply, such as a thermoplastic coated with Polyvinylidene fluoride or polyvinylidene difluoride (PVDF), e.g., the "Soltis 502" made by Ferrari Serge Sas.

Any material known, or hereinafter developed may be used to construct the inner bladder and the outer liner of the liquid container, as long as such material provides waterproof and liquid-impermeable characteristics to prevent leakage from the liquid container when the container is forcibly contained within the frame by the respective baffles and is filled with a liquid.

In a preferable, but not limiting embodiment, one or more of inner bladder 220 or inlet/outlet tube 550, may be arranged as single-use and disposable. Although reusable configurations are contemplated within the scope of the appending claims, it should be noted that single-use and disposable embodiments of the aforementioned, has particular benefits, namely, avoidance of the certified wash center fees associated with a wash of a liquid container and also efficiency, meaning that a necessary dry-time of a washed reusable bulk liquid container (e.g., at least two hours for collapsible and expandable designs) is avoided all together. Lastly, a single-use and disposable bulk liquid container is the most sanitary option for transporting bulk liquid cargo.

In a preferred embodiment of apparatus 100, fluid conduit 200 is arranged to be at least partially positioned within cutout 722 of baffle 700. Fluid conduit 200 may be comprised of valve 502 and inlet/out tube 550, which are fluidly connected in a removable manner, providing an inlet and/or outlet, into or out of fluid container 200, specifically inner bladder 220. As discussed supra, inlet/outlet tube 550 is preferably affixed to inner bladder 220 in a water-tight configuration, thus, making inlet/outlet tube 550 the single outlet and inlet to inner blader 220. Best shown in FIG. 5B, a portion of inlet/outlet tube 550 is removably secured to valve 502, thereby fluidly connecting valve 502 to inner bladder 220. In some embodiments, valve 502 has first opening 504 and second opening 506. In some embodiments, inlet/outlet tube 550 comprises elbow 552 which has first opening 554 and second opening 556, where second opening 556 connects to elongated section 558, specifically, first end 560 of elongated section 558. First opening 554 of elbow 552 is arranged to be removably and at least partially seated within second opening 506 of valve 502, thereby fluidly connecting elbow 552 to valve 502. First opening 554 of elbow 552 is configured with a cam-lock fitting that is designed to mate with a corresponding cam-lock fitting of second opening 506 of valve 502. First opening 504 of valve 502 may also be configured with a cam-locking fitting that is designed to removably connect to an external conduit, allowing fluid to be pumped into inner blade 220 or to allow fluid to be pumped out of inner bladder 220. Opposite first end 560 of elongated section 558 is second end 562, which is positioned within inner blade 220 proximate floor 3. First end 560 and second end 562 define the respective openings of elongated section 558. Preferably, second end 562 also includes plurality of apertures 564 therein, proximate second end 562 and circumscribing elongated section 558, allowing fluid to enter elongated section 558 is second end 562 is abutting an internal surface of inner bladder 220. In one possible arrangement, inner bladder 220 may include buffer 400, positioned directly below end 562 of elongated section 558, and preferably having a greater diameter than end 562. Buffer 400 is comprised of one or more of an additional layer of material, which may be the same material as inner bladder 220, or a thicker material than inner bladder 220, e.g., the same material as outer liner 210, and serves as an additional layer of protection for inner bladder 220 such that end 562 of elongated section 558 cannot puncture, tear, etc., inner blade 220 when end 562 is resting on the internal surface of inner bladder 220.

In a preferred embodiment, valve 502 is affixed to movable plate 602, which is translatably attached to mounting plate 600, where mounting plate 600 is connected to rear wall 110. Movable plate 602 is arranged within mounting plate 600 and can be selectively translated in the vertical direction, thereby moving valve 502 and a connected inlet/outlet tube 550 up and down. Therefore, in use, end 562 of elongated section 558 can be lowered such that end 562 touches the internal surface of inner bladder 220, specifically buffer 400, or can be raised such that there is a space between end 562 of elongated section 558 and the internal surface of inner bladder 220, specifically buffer 400. In use, when fluid is pumped into inner bladder 220 via valve 502 and inlet/outlet tube 550, it is preferable that end 562 is raised to allow the least resistance of the fluid filling inner bladder 220. When fluid is removed from inner bladder 220, via valve 502 and inlet/outlet tube 550, it is preferable that end 562 is lowered to contact buffer 400 or the internal surface of inner bladder 220, allowing plurality of apertures 564 of elongated section to be positioned at the lowest possible point to afford the highest level of fluid evacuation of inner bladder 220. The vertical translation afforded by movable plate 602, e.g., lowering end 562, along with the force of baffles 300 and 302 being applied onto inner bladder 220, allows a substantially complete emptying of fluid from inner bladder 220, unlike a simple gravity-fed outlet of prior solutions.

Figure 6A:
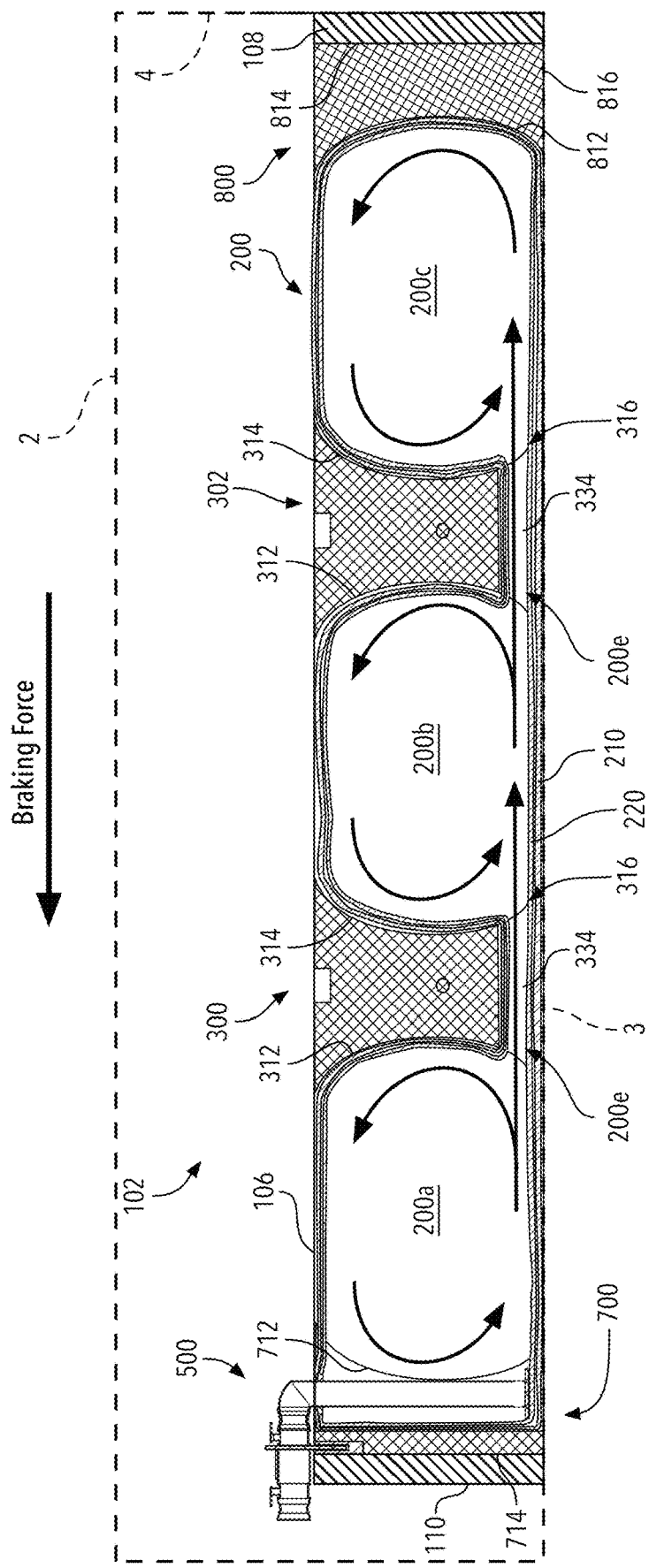
Figure 6B:
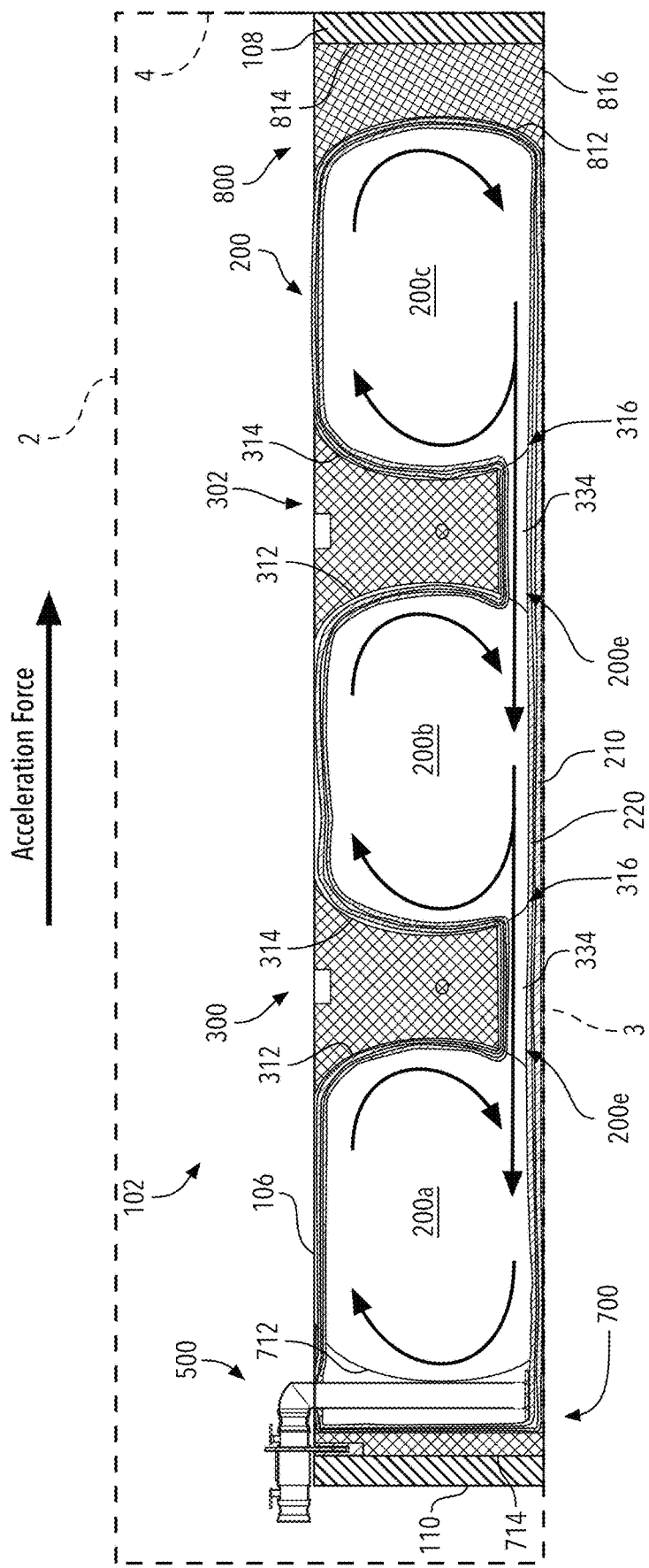

The following description should be taken in view of the aforementioned figures and FIGS. 6A through 6B, which generally is the cross-sectional view of FIG. 5 generally illustrating fluid movement within fluid container 200 of apparatus 100. Specifically, FIG. 6A generally shows how fluid moves and interacts with baffles 300, 302, 700, and 800 within fluid container 200 when shipping container 2 is subjected to braking force and FIG. 6B generally shows how fluid moves and interacts with baffles 300, 302, 700, and 800 within fluid container 200 when shipping container 2 is subjected to acceleration force. Each of the end baffles, baffles 700 and 800 have one concave face, concave faces 712 and 812, respectively. Each of the middle baffles, baffles 300 and 302 have a pair of oppositely facing concave faces, concave faces 312 and 314. All of the concave faces are designed to substantially redirect fluid within liquid container 200 away from the respective concave faces and in a direction towards floor 3 of shipping container 2. This configuration substantially reduces the liquid sloshing effect and the forces associated therewith, when shipping container 2 has braking (declaration) forces and acceleration forces applied thereto. Additionally, the sections created by baffles 300 and 302 prevent a substantial amount of fluid or liquid within liquid container 200 from flowing towards front wall 108 when a braking force is applied to shipping container 2 or from flowing towards rear wall 110 when an acceleration force is applied to shipping container 2. Instead, less fluid or liquid travels between sections 200a, 200b, and 200c via passages 200d and 200e formed by passageways 334 of baffles 300 and 302, further reducing the force the liquid or fluid may impart on shipping container at either ends thereof. Meanwhile, as shown in FIG. 4, the retaining members are also applying a downward force on fluid container 200, along with baffles 300 and 302, which helps maintain a lower center of gravity of the liquid within liquid container 200. All of these aspects of apparatus 100 provide for a safer method of transporting bulk liquid cargo within a shipping container.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

2 Shipping container
3 Floor
4 Front wall
6 Side wall

8 Side wall
9 Ceiling
10 Rail
12 Hooks
100 Liquid transporting container apparatus
102 Frame
104 Side wall
106 Side wall
108 Front wall
110 Rear wall
112 Pin
114 Pin
120 Adjustable connector
122 Hook
124 Housing
126 Spool
128 Rod
130 Tether
132 Loop
200 Collapsible liquid container
200a Section
200b Section
200c Section
200d Passage
200e Passage
210 Outer liner
212 Seal
214 Seam
220 Inner bladder
222 Seal
224 Seam
226 Bottom
250 Retraction line
252 Clips
300 First baffle
302 Second baffle
310 Top face
312 First concave face
314 Second concave face
316 Bottom face
318 First side face
320 Second side face
322 Channel
324 Support beam
326 First handle
328 Second handle
330 First extension
332 Second extension
334 Passageway
336 Internal support member
400 Buffer
500 Fluid conduit
502 Valve
504 First opening
506 Second opening
550 Inlet/outlet tube
552 Elbow
554 First opening
556 Second opening
558 Elongated section
560 First end
562 Second end
564 Plurality of apertures
600 Mounting plate
602 Movable plate
700 Rear end baffle
710 Top face
712 Concave face
714 Planar face
716 Bottom face
718 First side face
720 Second side face
722 Cutout
724 Internal support member
800 Front end baffle
810 Top face
812 Concave face
814 Planar face
816 Bottom face
818 First side face
820 Second side face
822 Internal support member
900 Retaining cover
902 Slot
904 Slot
906 Slot
908 Slot
910 Sleeve
912 Sleeve
914 Support member
916 Support member
D Distance
FE Front end
L1 Length
L2 Length
L3 Length
L4 Length
L5 Length
L6 Length
LD1 Longitudinal direction
LD2 Longitudinal direction
RE Rear end
SE1 Side end
SE2 Side end
TD1 Transverse direction
TD2 Transverse direction
VD1 Vertical direction
VD2 Vertical direction

What is claimed is:

1. An apparatus for use in a shipping container for selectively carrying solid freight and bulk liquid freight, comprising:
   a first side frame extending longitudinally with respect to said shipping container and fixedly secured thereto;
   a second side frame extending longitudinally with respect to said shipping container and fixedly secured thereto;
   a front frame positioned between said first and second side frames;
   a collapsible liquid container operatively arranged substantially between said first and second side frames, comprising:
      a liquid impermeable outer liner;
      a liquid impermeable inner bladder arranged within said outer liner; and,
      a fluid conduit in fluid communication with said inner bladder, comprising:
         a longitudinal tube portion having a first end and a second end, said first end arranged within said bladder and said second end extending through said inner bladder and affixed thereto; and,
         a connection elbow extending from said first end;
   a rear fame removably affixed to said first and second side frames opposite said front frame; and, at least one baffle operatively arranged to be positioned between said first and second side frames and on top of said collapsible liquid container, wherein said collapsible liquid container is adapted to be removably pinned at least partially within said frame via said at least one baffle.

2. The apparatus recited in claim 1, wherein said at least one baffle comprises:
a first baffle operatively arranged to be positioned between said first and second side frames and on top of said collapsible liquid container; and,
a second baffle operatively arranged to be positioned between said first and second side frames and on top of said collapsible liquid container and spaced apart from said first baffle.

3. The apparatus recited in claim 2, wherein each of said first and second baffles comprise:
a top face and a bottom face bounded by a pair of side faces;
a pair of concave faces disposed between said top and bottom faces; and,
a channel arranged within said pair of concave faces and said bottom face.

4. The apparatus recited in claim 3, wherein said baffles are comprised of one or more of an open cell foam or a closed cell foam.

5. The apparatus recited in claim 2, wherein each of said first and second baffles comprise:
a channel disposed within said top and said pair of side faces, said channel operatively arranged to accept a support member therein.

6. The apparatus recited in claim 1 further comprising:
a front end baffle arranged at least partially within said frames and proximate said front frame, said front end baffle having:
a top face and bottom face bounded by a pair of side faces;
a concave face disposed between said top and bottom faces and facing said rear frame; and,
a rear face disposed between said top and bottom faces and facing said front frame.

7. The apparatus recited in claim 6, wherein said front end baffle is comprised of one or more of an open cell foam or a closed cell foam.

8. The apparatus recited in claim 1 further comprising:
a rear end baffle arranged at least partially within said frames and proximate said rear frame, said rear end baffle having:
a top face and bottom face bounded by a pair of side faces;
a concave face disposed between said top and bottom faces and facing said rear frame;
a rear face disposed between said top and bottom faces and facing said rear frame; and,
a conduit channel disposed within said top, bottom, and concave face, wherein said conduit channel is adapted to accept said at least a portion of said fluid conduit at least partially therein.

9. The apparatus recited in claim 8, wherein said rear end baffle is comprised of one or more of an open cell foam or a closed cell foam.

10. The apparatus recited in claim 1 further comprising:
at least one retaining cover adapted to at least partially cover a space disposed between said side frames, said at one retaining cover retractably secured to a top surface one of said side frames and removably secured to a top surface of the opposite side frame, said at least one retaining cover further adapted to pin said at least one baffle onto said liquid container.

11. The apparatus recited in claim 1, further comprising:
a valve affixed to said front frame and arranged to removably secure to said connection elbow.

12. The apparatus recited in claim 11, further comprising:
a sliding plate connected to said rear frame and adapted to move vertically, said valve affixed to said sliding plate.

13. The apparatus recited in claim 1, wherein said at least one baffle is configured to absorb energy from liquid disposed in said collapsible liquid container.

14. The apparatus recited in claim 1 further comprising:
a retraction line removably secured to said liquid container, said retraction line adapted to be secured to an inner surface of a wall of the shipping container, thereby allowing said fluid container to be pulled along said retraction line in a direction towards said front frame when said fluid container is empty.

15. An apparatus for use in a shipping container for selectively carrying solid freight and bulk liquid freight, comprising:
a first side frame extending longitudinally with respect to said shipping container and fixedly secured thereto;
a second side frame extending longitudinally with respect to said shipping container and fixedly secured thereto;
a rear frame positioned between said first and second side frames;
a collapsible liquid container operatively arranged substantially between said first and second side frames, comprising:
a liquid impermeable outer liner;
a liquid impermeable inner bladder arranged within said outer liner; and,
a fluid conduit in fluid communication with said inner bladder;
a front fame removably affixed to said first and second side frames opposite said rear frame;
at least one baffle operatively arranged to be positioned between said first and second side frames and on top of said collapsible liquid container;
a first end baffle operatively arranged to be positioned between said first and second side frames and proximate said front frame, said first end baffle having a concave face facing said rear frame; and,
a second end baffle operatively arranged to be positioned between said first and second side frames and proximate said rear frame, said second end baffle having a concave face facing said front frame, said second end baffle having a channel disposed within its concave face, wherein said collapsible liquid container is adapted to be removably pinned at least partially within said frame via said at least one baffle, wherein a portion of said fluid conduit is arranged to be at least partial arranged within said channel of said second end baffle.

16. The apparatus recited in claim 15, wherein said at least one baffle comprises:
a first baffle operatively arranged to be positioned between said first and second side frames and on top of said collapsible liquid container; and,
a second baffle operatively arranged to be positioned between said first and second side frames and on top of said collapsible liquid container and spaced apart from said first baffle.

17. The apparatus recited in claim 16, wherein each of said first and second baffles comprise:
a top face and a bottom face bounded by a pair of side faces;

a pair of concave faces disposed between said top and bottom faces; and, a channel arranged within said pair of concave faces and said bottom face.

18. The apparatus recited in claim 16, wherein each of said first and second baffles comprise:

a channel disposed within said top and said pair of side faces, said channel operatively arranged to accept a support member therein.

19. The apparatus recited in claim 15, further comprising:

a sliding plate connected to said rear frame and adapted to move vertically, said fluid conduit affixed to said sliding plate.

20. The apparatus recited in claim 15, wherein said fluid conduit further comprises:

a longitudinal tube portion having a first end and a second end, said first end arranged within said inner bladder and said second end extending through said inner bladder and affixed thereto; and, a connection elbow extending from said first end, wherein said fluid conduit is slidably connected to said rear frame and adapted to translate in a vertical direction.

\* \* \* \* \*

UNITED STATES PATENT AND TRADEMARK OFFICE
CERTIFICATE OF CORRECTION

PATENT NO. : 12,337,745 B1
APPLICATION NO. : 18/901281
DATED : June 24, 2025
INVENTOR(S) : David Buonerba and John C. Cunningham Page 1 of 1

It is certified that error appears in the above-identified patent and that said Letters Patent is hereby corrected as shown below:

In the Claims

Column 16, Line 63, Claim 1 should read:
"inner bladder and said second end extending through"

Column 18, Line 36, Claim 15 should read:
"a front frame removably affixed to said first and second"

Signed and Sealed this
Sixth Day of January, 2026

John A. Squires
*Director of the United States Patent and Trademark Office*